(No Model.) 4 Sheets—Sheet 1.

C. R. BAILLIE-HAMILTON.
VELOCIPEDE.

No. 270,896. Patented Jan. 23, 1883.

(No Model.) 4 Sheets—Sheet 2.

C. R. BAILLIE-HAMILTON.
VELOCIPEDE.

No. 270,896. Patented Jan. 23, 1883.

Witnesses:
F. M. Burnham.
John A. Wiedersheim

Inventor:
Charles R Baillie-Hamilton
by
Wm H Babcock
Atty (No Model.) 4 Sheets—Sheet 3.

C. R. BAILLIE-HAMILTON.
VELOCIPEDE.

No. 270,896. Patented Jan. 23, 1883.

Witnesses:

Inventor:
Charles R. Baillie-Hamilton
by Wm H Babcock
Attorney (No Model.) 4 Sheets—Sheet 4.

C. R. BAILLIE-HAMILTON.
VELOCIPEDE.

No. 270,896. Patented Jan. 23, 1883.

Witnesses:
Inventor:
Charles R Baillie-Hamilton

UNITED STATES PATENT OFFICE.

CHARLES ROBERT BAILLIE-HAMILTON, OF GREENWICH, COUNTY OF KENT, ENGLAND.

VELOCIPEDE.

SPECIFICATION forming part of Letters Patent No. 270,896, dated January 23, 1883.

Application filed July 7, 1882. (No model.) Patented in England December 5, 1881, No. 5,305.

*To all whom it may concern:*

Be it known that I, CHARLES ROBERT BAILLIE-HAMILTON, a subject of the Queen of Great Britain, residing at Greenwich, in the county of Kent and Kingdom of England, have invented new and useful Improvements in Bicycles and other Velocipedes, (for which I have obtained a patent in Great Britain, No. 5,305, bearing date December 5, 1881,) of which the following is a specification.

This invention relates to bicycles which have movable seats that are arranged to utilize the weight of the rider for the rotation of the wheel; and it consists in the construction and combination of parts hereinafter particularly set forth and claimed.

In order that my said invention may be better understood and readily carried into effect, I will now, with the aid of the accompanying drawings, (whereon similar figures and letters of reference indicate corresponding parts,) proceed more particularly to describe the same.

Figure 1:
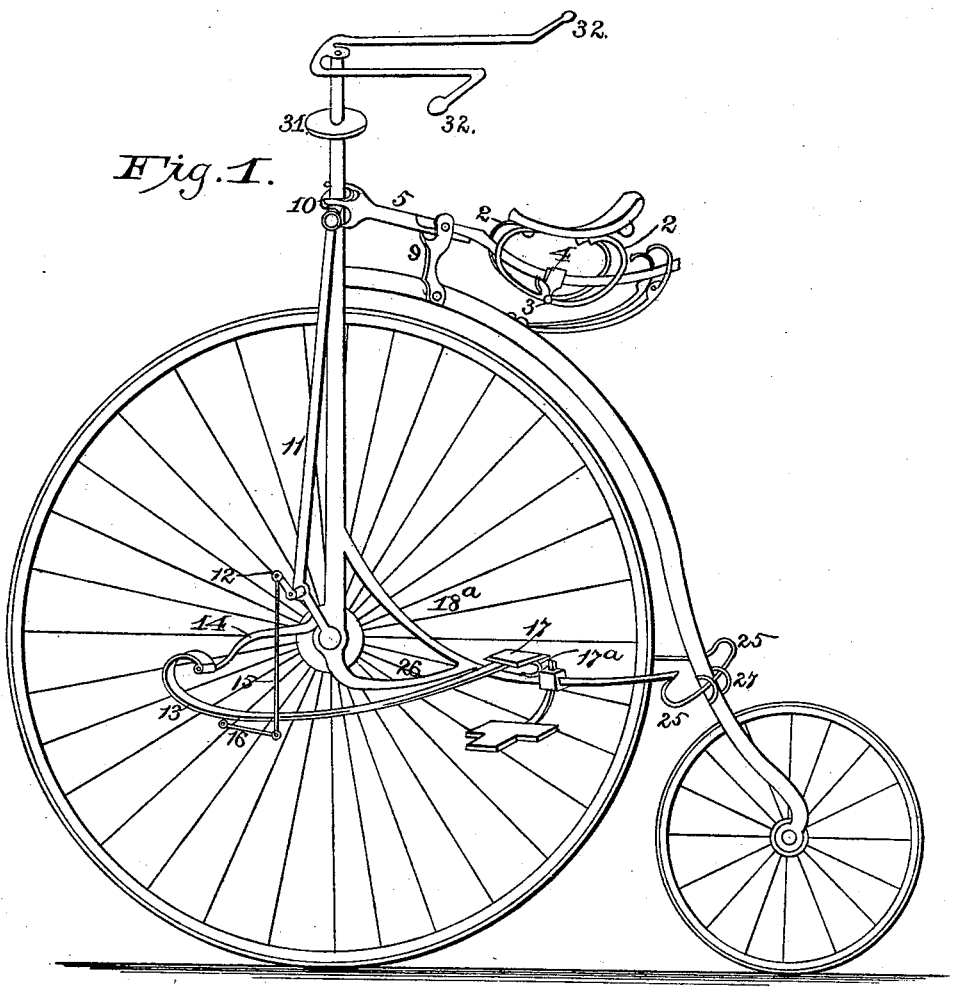

Figure 1 of such drawings shows a view in side elevation of a bicycle with my invention applied thereto. The remainder of the figures show views in detail of the various parts of my invention, and will be referred to *seriatim* in the following description.

Figure 2:
Figure 3:
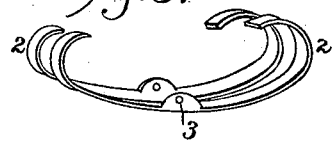
Figure 4:
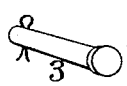
Figure 5:
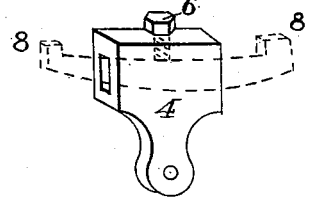
Figure 10:
Figure 11:
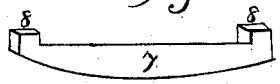

In order to carry out of my invention, I fit a bicycle or other velocipede with a saddle, 1, (see Fig. 2,) capable of rising and falling according to the movements of the rider. Such saddle is mounted upon elliptical or other suitably-curved springs 2, (see Fig. 3,) pivoted on a pin, 3, (see Fig. 4,) which connects them with a slotted boss, 4, (see Fig. 5,) mounted upon the shank of a jointed bifurcated lever, 5, presently more particularly described. Such boss can readily be adjusted either backward or forward by the rider to any desired position, and when so adjusted is fixed in position by a screw, 6, (see Fig. 10,) inserted at the top, which screw presses on a metal key, 7, (see Figs. 10, 11,) wedged in between the boss and the lever-shank. This key has two toothed projections, 8, formed upon it, one at each end, while it is made wedge-shaped and slightly curvilinear in form, so that when secured it bites at either end, and is prevented from working loose through the vibration of the machine by the toothed projections before mentioned.

Figure 6:
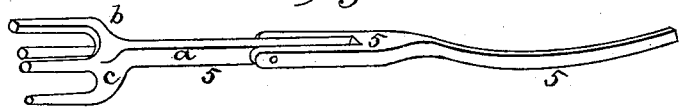
Figure 7:
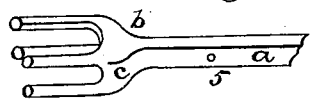
Figure 8:
Figure 9:
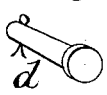

The jointed bifurcated lever before referred to consists of a fore part, *a*, in which one or more perforations are made (see Fig. 7) to allow of the adjustment of the boss, as already described, while such fore end terminates in two bifurcated arms, *b c*, so as to allow the upright part of the fork of the bicycle to pass between such arms, as seen in Fig. 1. The shank of this jointed bifurcated lever is supported on a pin, *d*, which passes through the standard and also through the fore part of the lever, while a recess, *e*, is formed in such shank, which restrains the end of the fore part of the lever from working upward at the same time that it leaves it free to play downward. Detail views of this jointed bifurcated lever are shown at Figs. 6, 7, 8, while Fig. 9 shows a view of the pin *d*, which connects the two parts of the lever.

Figure 12:
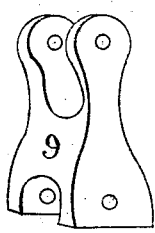
Figure 13:
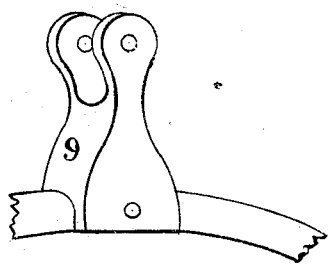
Figure 14:
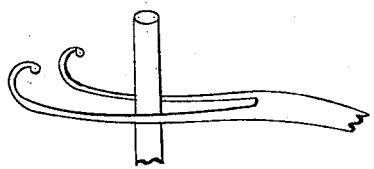

A standard, 9, (see Figs. 12, 13,) is either mounted or formed on the backbone of the bicycle; or, in the case of tricycles and other similar vehicles, it may be placed in any other convenient position, which standard forms a fulcrum whereon the lever works. I sometimes form this standard by means of a projection on either side of the upper part of the fork of the machine.

Figure 15:
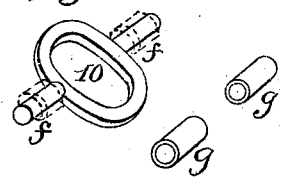

An oval sliding ring, 10, (see Fig. 15,) provided with two short lateral projections, *f*, having rollers *g* mounted thereon, so as to obviate friction, is fitted between the bifurcated arms of the lever, the extremities of such arms being sheathed in suitable metal casings, and this oval ring is supported and held in position by the projections *f*, which lodge in the lateral recesses formed by the bifurcations. When motion is imparted to the vehicle such oval sliding ring travels up and down the upper part or shank of the fork, such shank being elongated sufficiently to allow free scope for such travel.

Figure 16:
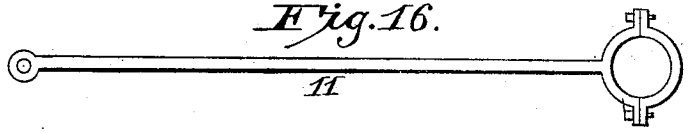
Figure 17:
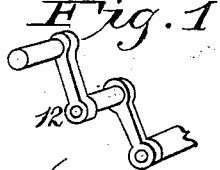
Figure 18:
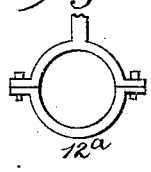

To the extremity of each of the short lateral projections *f* connecting-rods 11 (see Figs. 16) are attached, the lower ends of which rods are fastened to and operate a pedal-crank, 12, (see Fig. 17,) which is made of a zigzag form, in order to give a greater throw to the feet, and is mounted on the shaft of the driving-wheel of the vehicle; or, instead of such pedal-crank, an eccentric, indicated at 12ª, (see Fig. 18,) may be employed. Motion is transmitted to the connecting-rods through the jointed bifurcated lever, and thence to such pedal-crank or its equivalent, the shorter portion of such crank, when a crank is employed, producing one half of the revolution, while the other half of such revolution is produced by a lever, 13, (see Fig. 19,) attached to a support, 14. Such lever has an orifice formed therein, through which a connecting-rod, 15, passes, and is attached at its upper end to the pedal-crank or its equivalent, and at its lower end terminates in a nut, 15ª, whereto a suitable stay, 16, is pivoted, while at the outer extremity of such lever a treadle-plate, 17, is affixed, beneath which an india-rubber pad or suitable springs, 17ª, are fitted, which serve to break the force of the shock by being brought in contact with the treadle-plate when it is depressed.

Figure 19:
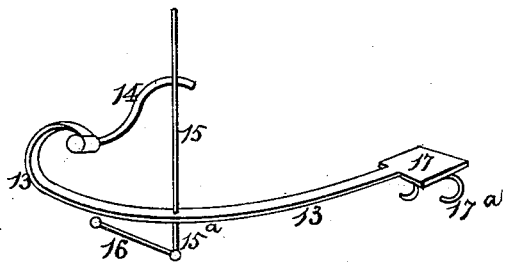
Figure 20:
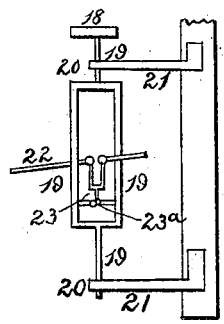

If it be desired to procure an up-and-down motion of the feet, so as to avoid the segment of the circle described by the end of the pedal-lever, and to have a reciprocating motion with the saddle, of which it is an important and essential adjunct, I fix a pedal-support, 18, (see Fig. 20,) to the end of an upright rod, 19, which travels freely through two rings, 20, fixed on supports 21, such rod being opened in the middle part, so as to let the end of the pedal-lever 22 pass through it, the lever being connected by a rod, 23, working on pins or hinges with one end of the opening, as shown at Fig. 20, and the springs 17ª being placed under the pedal, as in the arrangement illustrated at Fig. 19. I would here observe that the first half or nearly the first half of the revolution is produced by the weight of the rider's body resting on the saddle, and thus communicating by means of the jointed bifurcated lever and the other mechanism connected therewith the necessary impetus.

Figure 21:
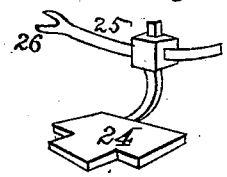
Figure 22:
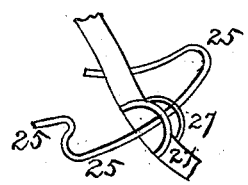

A wire fender (not shown in the drawings) is provided in order to prevent the rider's legs from slipping into the wheel, while on each side of the machine a foot-rest, 24, (see Fig. 21,) is likewise provided, and is attached to an arm or extension, 25, which springs from or is a prolongation of the end of the fork of the machine. Such arm or extension 25 is held in position by suitable supports, 26. These foot-rests afford a support to the feet when not engaged in working the treadles. When required, such arm or extension 25 may be continued so as to pass round outside the backbone of the vehicle, and thus impart additional stability thereto. When this arrangement is adopted the arm or extension is secured in position by two eyes, 27, or their equivalents. This arrangement is illustrated at Fig. 22 of the drawings.

A suitable brake is mounted on the crank-shaft, in order to enable the rider to control the movements of the vehicle.

Figure 23:
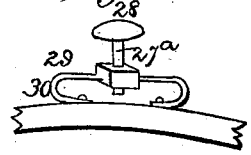
Figure 24:
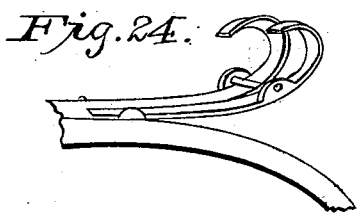

A pad or buffer of rubber, 27ª, (see Fig. 23,) is attached by a screw, 28, so that it can be raised and depressed to a boss, 29, mounted on a spring, 30, connected with the backbone of the machine, and the end of the lever with which the saddle is connected rests on this pad at the end of the downward action of the body. This arrangement is illustrated at Fig. 23, while Fig. 24 shows an alternative arrangement.

A metal shield-plate, 31, (see Fig. 1,) is fixed to the upright part of the fork as a protection to the mechanism, and the handles 32 (see Fig. 1) are made to any convenient curve, so as to be within easy reach, in view of the altered position of the rider's body.

Figure 25:
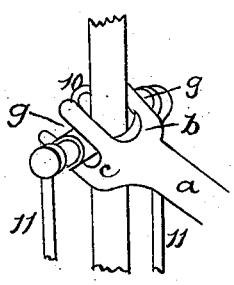

Fig. 25 shows a view in perspective of the mechanism at the top of the elongated shank of the fork already described.

Having thus particularly described and ascertained the nature of my said invention and the manner of carrying the same into operation, I would have it understood that what I claim, and desire to secure by the hereinbefore-in-part-recited Letters Patent, is—

1. In a velocipede, the combination of the seat mounted on springs connected by a pin to a boss, 4, with the lever 5, upon which said boss is adjustable, the standard 9, forming a fulcrum, wherein said lever works, and devices connecting said lever with the cranks of the velocipede, substantially as set forth.

2. In a velocipede, the combination of the seat mounted on elliptical springs connected at the middle by a pin to a slotted boss, 4, with the bifurcated lever 5, upon which said boss is adjusted, the standard 9, forming a fulcrum for said lever, the sliding ring 10, provided with projections $f$, having rollers $g$ and fitted between the bifurcated arms of said lever, and devices connecting said ring with the pedal-cranks, substantially as set forth.

3. In a velocipede, the sliding ring 10, provided with projections $f$, having lateral rollers $g$ mounted thereon, in combination with the bifurcated lever 5, between the arms $b$ $c$ of which said ring is fitted, the seat connected to said lever, a plate, 31, and devices for connecting the projections $f$ with the pedal-cranks of the velocipede, substantially as set forth.

4. In a velocipede, the bifurcated lever, consisting of a fore part, $a$, having perforations, and terminating at its fore end in bifurcated arms $b$ $c$, the shank formed with a recess, $e$, and adapted to be connected to the fore part by a pin, $d$, in combination with the slotted boss 4, adjustable on said lever 5, the seat mounted on springs connected with said slotted boss, and devices for connecting the fore end of said lever to the pedal-cranks and the joint of the two parts of said lever to the backbone of the velocipede, substantially as set forth.

5. In combination with the movable lever on which the seat is mounted, a vertically-adjustable spring-supported pad or buffer, 28, arranged under the said lever to receive the impact thereof, substantially as set forth.

6. In combination with the wheel, backbone, and fork of a bicycle, an arm, 25, bent around behind said wheel and backbone and forming a looped prolongation of said fork, said arm being provided with suitable supports and foot-rests, substantially as set forth.

7. The crank 12 of a velocipede, in combination with lever 13, attached to a support, 14, said lever having an orifice formed therein, through which a connecting-rod, 15, passes, and a treadle-plate, 17, at the outer extremity of said lever, said connecting-rod being attached at its upper end to said crank 12, and provided with a suitable stay, 16, at its lower end, substantially as set forth.

8. The standard 9, formed on the backbone of the velocipede and connected to the bifurcated lever 5 at the junction of the shank and fore part thereof, in combination with the seat connected to said lever, as set forth.

CHARLES ROBERT BAILLIE-HAMILTON.

Witnesses:
SHIRLEY BOWDEN,
F. BOWDEN,
*Both of London.*